United States Patent
Lovett et al.

(10) Patent No.: US 7,650,737 B1
(45) Date of Patent: Jan. 26, 2010

(54) REEL FINGER FOR USE ON A HARVESTING HEADER FOR AN AGRICULTURAL MACHINE

(75) Inventors: Benjamin M. Lovett, Colona, IL (US);
Todd N. Signer, East Moline, IL (US);
Bruce A. Coers, Hillsdale, IL (US);
Gregory S. Mccunn, Orion, IL (US);
Amy C. Berg, Milan, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/233,210

(22) Filed: Sep. 18, 2008

(51) Int. Cl.
*A01D 57/00* (2006.01)
(52) U.S. Cl. ....................... 56/220
(58) Field of Classification Search ............. 56/220, 56/400, 219, 227, 12.4, 364
See application file for complete search history.

(56) References Cited

U.S. PATENT DOCUMENTS

| | | | | |
|---|---|---|---|---|
| 1,996,294 A * | 4/1935 | Hume et al. | ........... | 56/181 |
| 2,406,706 A * | 8/1946 | Oehler et al. | ........... | 56/226 |
| 2,492,881 A * | 12/1949 | Oehler et al. | ........... | 56/226 |
| 2,497,729 A * | 2/1950 | Tallman et al. | ........... | 56/226 |
| 2,608,045 A * | 8/1952 | Keene | ........... | 56/400 |
| 3,148,494 A * | 9/1964 | Scheidenhelm | ........... | 56/400 |
| 3,667,198 A * | 6/1972 | Gibson | ........... | 56/227 |
| 3,796,030 A * | 3/1974 | Neal et al. | ........... | 56/220 |
| 3,869,847 A * | 3/1975 | May | ........... | 56/220 |
| 4,255,921 A * | 3/1981 | Kirby | ........... | 56/220 |
| 4,459,797 A * | 7/1984 | Gessel et al. | ........... | 56/220 |
| 4,472,928 A * | 9/1984 | Easton | ........... | 56/220 |
| 4,520,620 A * | 6/1985 | Gessel et al. | ........... | 56/400 |
| 4,630,432 A * | 12/1986 | Love et al. | ........... | 56/220 |
| 4,833,869 A * | 5/1989 | Klein | ........... | 56/220 |
| 4,882,899 A * | 11/1989 | Jasper et al. | ........... | 56/220 |
| 4,901,511 A * | 2/1990 | Yarmashev et al. | ........... | 56/220 |
| 5,595,052 A * | 1/1997 | Jasper et al. | ........... | 56/220 |
| 6,199,358 B1 * | 3/2001 | Majkrzak | ........... | 56/400 |
| 6,397,573 B2 * | 6/2002 | Majkrzak | ........... | 56/220 |
| 6,910,323 B2 * | 6/2005 | Bickel | ........... | 56/220 |
| 7,124,564 B2 * | 10/2006 | Glazik et al. | ........... | 56/220 |
| 2007/0119606 A1 * | 5/2007 | Barber et al. | ........... | 171/63 |
| 2007/0266692 A1 * | 11/2007 | Lolley | ........... | 56/364 |
| 2007/0289280 A1 * | 12/2007 | Marquardt | ........... | 56/16.1 |
| 2009/0056295 A1 * | 3/2009 | Lolley | ........... | 56/220 |

FOREIGN PATENT DOCUMENTS

| | | | | |
|---|---|---|---|---|
| JP | 07213141 A | * | 8/1995 | |
| JP | 2005211010 A | * | 8/2005 | |

* cited by examiner

*Primary Examiner*—Árpád Fábián-Kovács
(74) *Attorney, Agent, or Firm*—Taylor & Aust, P.C.

(57) ABSTRACT

A reel finger for use on a harvesting header for an agricultural machine includes an elongate member having a proximal end and a distal end. The elongate member has a retaining member located at the proximal end. A plate member is connected to the elongate member with the distal end of the elongate member extending beyond the plate member. The plate member has a continuous smooth front surface for engaging a crop in a direction of crop engagement that covers a portion of the elongate member not extending beyond the plate member. The plate member has a back surface opposite to the front surface.

22 Claims, 4 Drawing Sheets

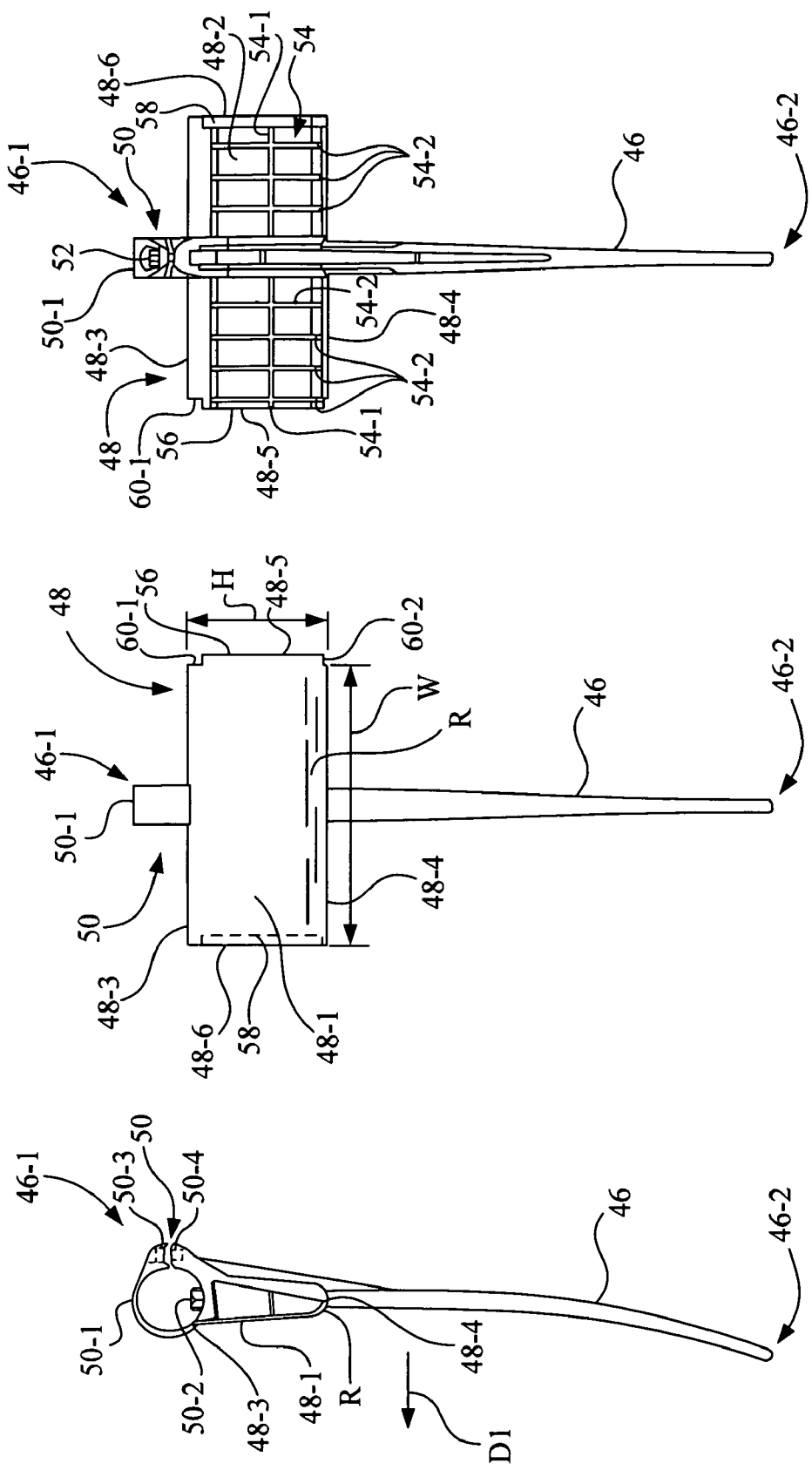

REEL FINGER FOR USE ON A HARVESTING HEADER FOR AN AGRICULTURAL MACHINE

FIELD OF THE INVENTION

The present invention relates to agricultural harvesters, and, more particularly, to agricultural combines including a reel having a plurality of reel fingers.

BACKGROUND OF THE INVENTION

An agricultural harvester such as a combine includes a harvesting header and a feeder housing which remove the crop material from the field, gather the crop material and transport the crop material to a separator of the combine. In the case of thinner stemmed crops such as soybeans, wheat, etc. which may be cut with a cutter bar assembly carrying a plurality of knife sections, the header may also be known as a cutting platform. Such a harvesting header includes a rotating reel having a plurality of reel fingers that push the crop into the header, and more particularly, into and over the cutter bar assembly. Under some field conditions, a typical reel finger tends to catch and retain the crop, which results in crop wrapping around the reel.

SUMMARY OF THE INVENTION

The invention, in one form thereof, is directed to a reel finger for use on a harvesting header for an agricultural machine. The reel finger includes an elongate member having a proximal end and a distal end. The elongate member has a retaining member located at the proximal end. A plate member is connected to the elongate member with the distal end of the elongate member extending beyond the plate member. The plate member has a continuous smooth front surface for engaging a crop in a direction of crop engagement that covers a portion of the elongate member not extending beyond the plate member. The plate member has a back surface opposite to the front surface.

The invention, in another form thereof, is directed to a reel finger for use on a harvesting header for an agricultural machine. The reel finger includes an elongate member having a proximal end and a distal end. The elongate member has a retaining member located at the proximal end. A plate member is connected to the elongate member with the distal end of the elongate member extending beyond the plate member. The plate member has a front surface for engaging a crop in a direction of crop engagement. The plate member has a back surface opposite to the front surface. The plate member has a proximal edge, a distal edge, a first end and a second end. The plate member has a height that extends from the proximal edge to the distal edge in a direction from the proximal end of the elongate member toward the distal end of the elongate member and has a width perpendicular to the height that extends from the first end toward the second end. The plate member has an interlock tab located adjacent the first end and has an interlock channel located adjacent the second end.

The invention, in another form thereof, is directed to an agricultural harvester. The agricultural harvester includes a power source, a feeder housing drivably coupled to the power source, and a harvesting header attached to the feeder housing. The harvesting header includes a platform, a cutter bar assembly and a reel assembly. The cutter bar assembly and the reel assembly are coupled to the platform. The reel assembly includes a reel having a plurality of bat tubes spaced around a periphery of the reel. The bat tubes have a length that extends in a direction of a width of the reel. A respective plurality of reel fingers is mounted to each bat tube of the plurality of bat tubes. Each reel finger of the plurality of reel fingers includes an elongate member having a proximal end and a distal end. A plate member is connected to the elongate member with the distal end of the elongate member extending beyond the plate member. The plate member has a continuous smooth front surface for engaging a crop in a direction of crop engagement that covers a portion of the elongate member not extending beyond the plate member.

The invention, in another form thereof, is directed to an agricultural harvester. The agricultural harvester includes a power source, a feeder housing drivably coupled to the power source, and a harvesting header attached to the feeder housing. The harvesting header includes a platform, a cutter bar assembly and a reel assembly. The cutter bar assembly and the reel assembly are coupled to the platform. The reel assembly includes a reel having a plurality of bat tubes spaced around a periphery of the reel. The plurality of bat tubes has a length that extends in a direction of a width of the reel. A respective plurality of reel fingers is mounted to each bat tube of the plurality of bat tubes. Each reel finger of the plurality of reel fingers includes an elongate member having a proximal end and a distal end. A plate member is connected to the elongate member with the distal end of the elongate member extending beyond the plate member. The plate member has a front surface for engaging a crop in a direction of crop engagement. The plate member has a back surface opposite to the front surface. The plate member has a proximal edge, a distal edge, a first end and a second end. The plate member has a height that extends from the proximal edge to the distal edge in a direction from the proximal end of the elongate member toward the distal end of the elongate member and has a width perpendicular to the height that extends from the first end toward the second end. The plate member has an interlock tab located adjacent the first end and an interlock channel located adjacent the second end. For an adjacent pair of reel fingers of the plurality of reel fingers, the interlock tab of a first reel finger of the adjacent pair of reel fingers is engaged with the interlock channel of a second reel finger of the adjacent pair of reel fingers.

BRIEF DESCRIPTION OF THE DRAWINGS

FIGS. 4A, 4B and 4C are side, front and back views, respectively, of a reel finger configured in accordance with an embodiment of the present invention for use on the reel and harvesting header of FIGS. 1-3.

DETAILED DESCRIPTION OF THE INVENTION

Figure 1:
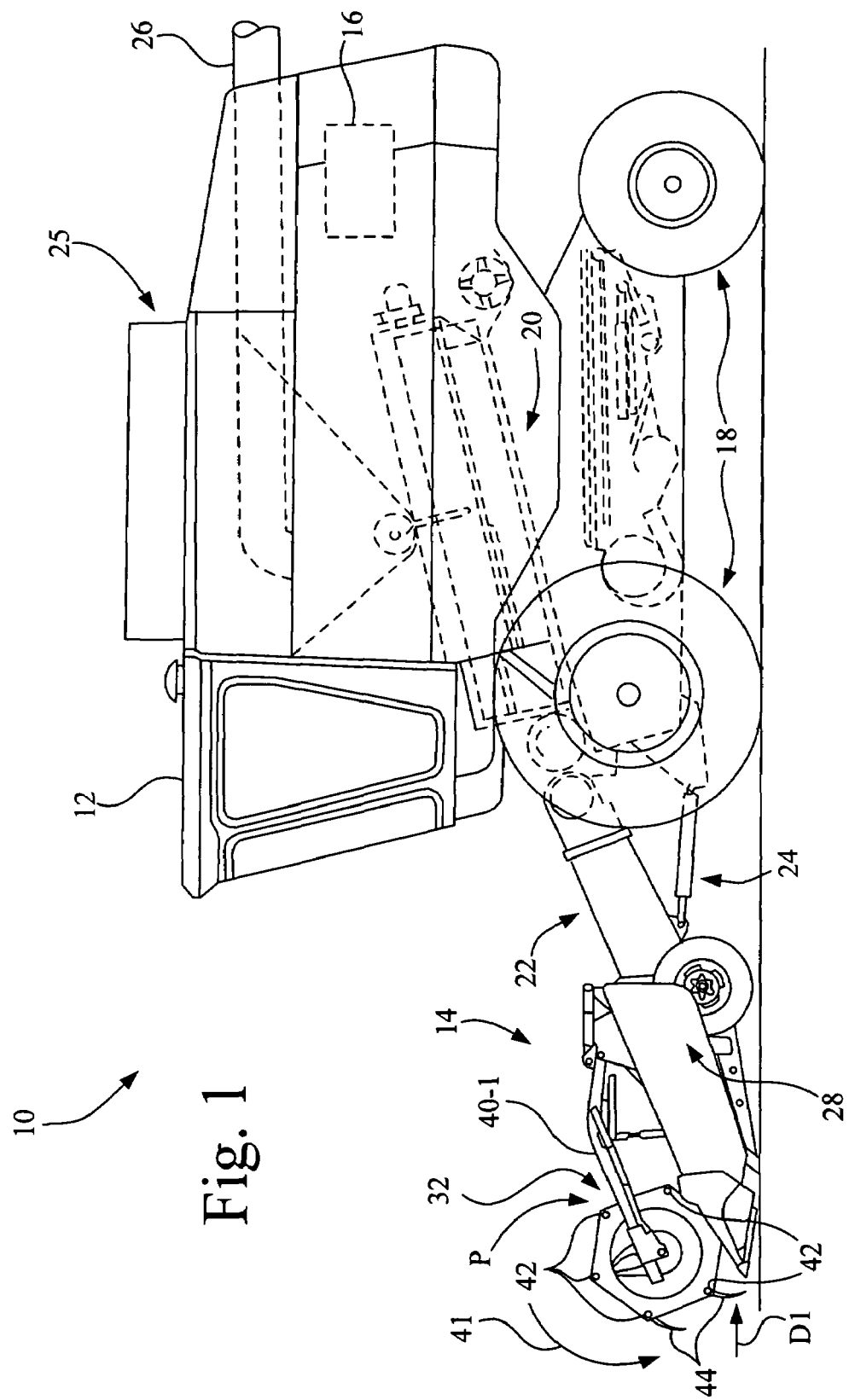
FIG. 1 is a diagrammatic side view of an agricultural harvester in the form of a self-propelled combine having a harvesting header configured in accordance with an embodiment of the present invention.

Referring now to the drawings, and more particularly to FIG. 1, there is shown an embodiment of an agricultural harvester in the form of a self-propelled combine 10 commonly used in a grain farming operation to harvest a variety of crops from a field. An operator controls combine 10 from an operator's station located in a cab 12. Combine 10 is configured to carry a harvesting header 14 at the forward end thereof. An onboard power source 16 (shown schematically) includes an engine and power transmission system for providing power to the ground engaging wheels 18 that support and propel combine 10, to harvesting header 14, and to threshing and separating assemblies 20.

Combine 10 includes a feeder housing 22 drivably coupled to power source 16. Feeder housing 22 pivotally attaches at the front of the combine 10 for supporting harvesting header 14. Harvesting header 14 is removably attached to the front of the feeder housing 22. A pair of lift cylinders 24 support and articulate feeder housing 22 from combine 10, enabling the raising and lowering of harvesting header 14 relative to the ground. Lift cylinders 24 may be single or double acting hydraulic cylinders connected to a main hydraulic circuit on combine 10.

During a harvesting operation, combine 10 moves forward through the field with harvesting header 14 lowered to a working height. Harvesting header 14 cuts and transfers crop material to feeder housing 22, which in turn transfers the crop material to feeder housing to combine 10. Once inside the combine, threshing and separating assemblies 20 remove grain from the crop material and transfer it to a grain tank 25 for temporary holding. Crop material other than grain exits from the rear of the combine 10. An unloading auger 26 transfers the grain from grain tank 25 to a truck or grain cart for transport, or to another receiving bin for holding.

Figure 2:
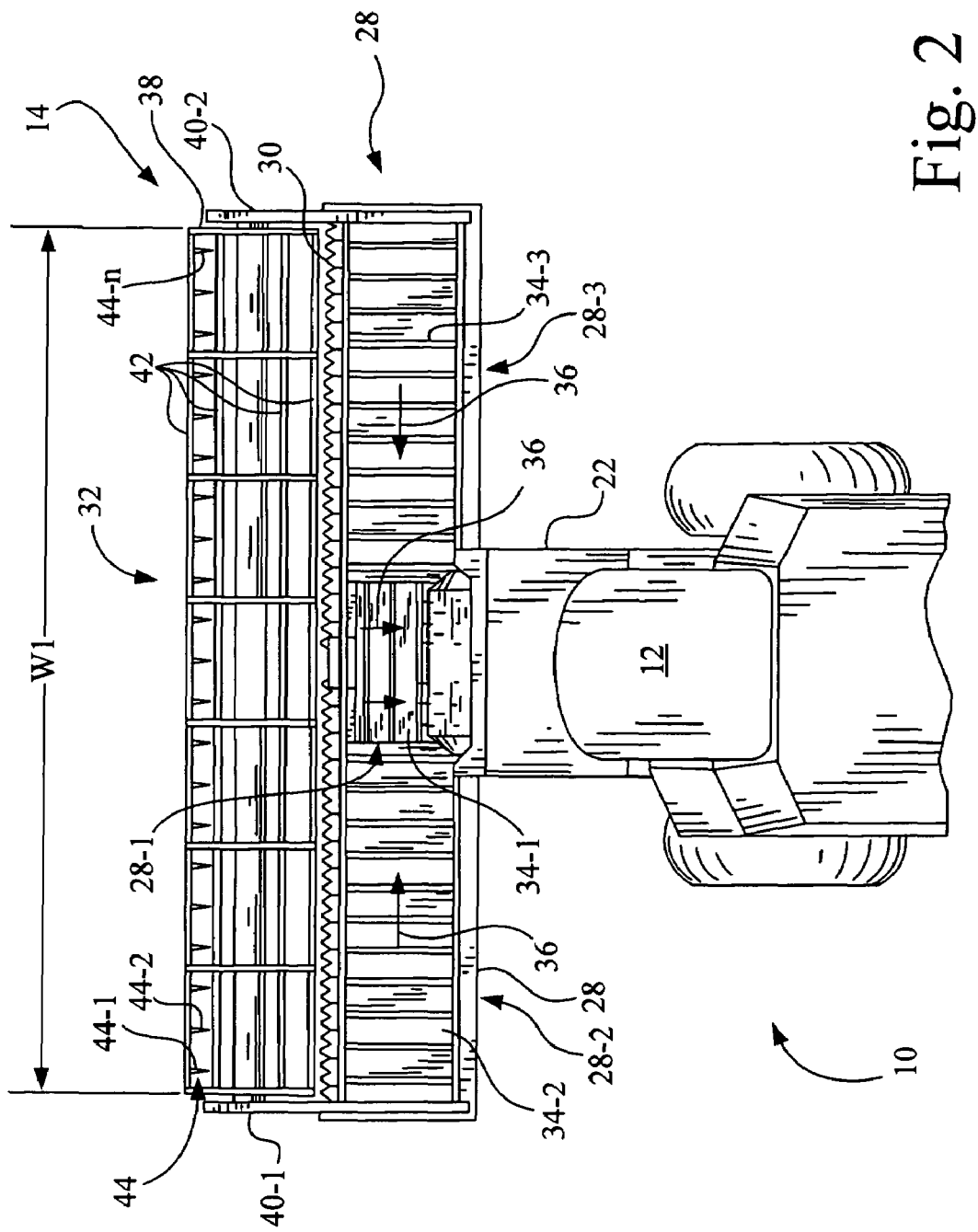
FIG. 2 is a top view of a portion of the combine of FIG. 1.

FIG. 2 illustrates a top view of harvesting header 14. Harvesting header 14 includes a platform 28, a cutter bar assembly 30 and a reel assembly 32. In the embodiment shown, platform 28 includes a center platform section 28-1, a wing platform section 28-2, and a wing platform section 28-3. Although shown with three platform sections, harvesting header 14 may be configured with more or less platform sections, depending upon the particular application.

In the present embodiment, platform sections 28-1, 28-2 and 28-3 generally includes a plurality of float arms (not shown) that mount cutter bar assembly 30, and respectively include at least one endless belt 34-1, 34-2, or 34-3 for carrying crop material in the direction of arrows 36 from harvesting header 14 to feeder housing 22.

Reel assembly 32 includes at least one reel 38 that is mounted to platform 28 via reel support arms 40-1, 40-2. Reel 38 rotates in a rotational direction 41. Each reel support arm 40-1, 40-2 may be selectively moved up and down using a hydraulic cylinder, and the pair of hydraulic cylinders are typically coupled in parallel so that they move together upon actuation. Reel 38 includes a plurality of bat tubes 42 spaced around the periphery P of reel 38. For convenience, each individual bat tube is referenced by element number 42. Each bat tube of the plurality of bat tubes 42 has a length that extends in the direction of the width W1 of reel 38. Mounted to each bat tube 42 is a respective plurality of reel fingers 44. Each respective plurality of reel fingers 44 includes multiple reel fingers 44-1 through 44-n.

Figure 3:
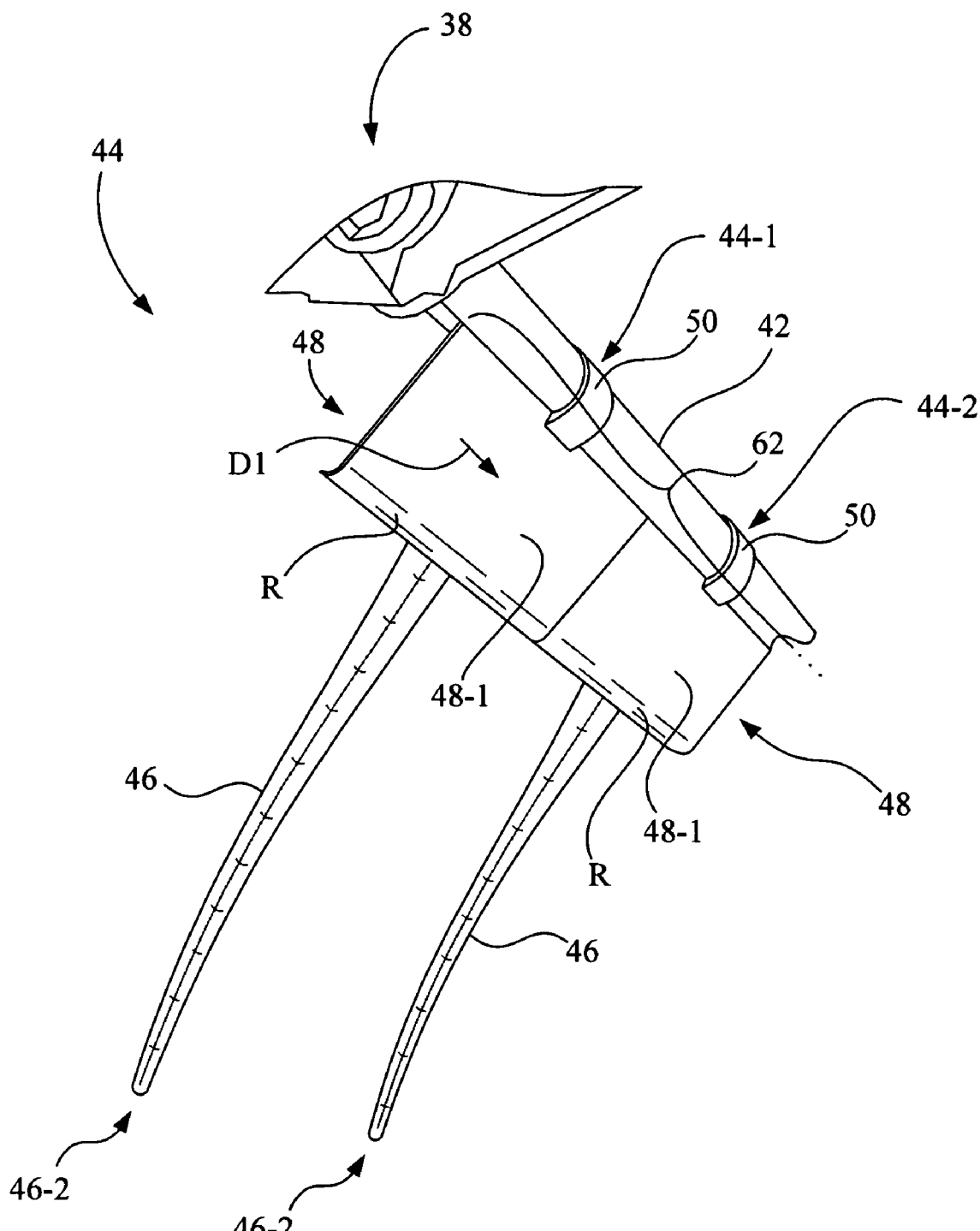
FIG. 3 is a perspective view of a portion of the reel of the harvesting header of FIGS. 1 and 2.

FIG. 3 shows a portion of reel 38 including two reel fingers of the plurality of reel fingers 44, identified as reel finger 44-1 and reel finger 44-2. Each reel finger of the plurality of reel fingers 44 is substantially identical in construction, and thus for brevity only the configuration of reel finger 44-1 will be discussed herein in detail. Thus, it is to be understood that the discussion of the configuration of reel finger 44-1 that follows may be applied to the configuration of each of the plurality of reel fingers 44.

Referring to FIGS. 4A, 4B and 4C, there is shown a side (profile) view, a front view and a back view, respectively, of reel finger 44-1. In one embodiment, for example, reel finger 44-1 may be formed as a unitary single-piece item, and more particularly, may be molded, for example, from an impact resistant plastic.

Reel finger 44-1 includes an elongate member 46 and a plate member 48. Elongate member 46 has a proximal end 46-1 and a distal end 46-2. Elongate member 46 has a retaining member 50 located at proximal end 46-1. Elongate member 46 tapers in a direction from proximal end 46-1 toward distal end 46-2. Referring to FIGS. 1, 3 and 4A, elongate member 46 has a curvature that is concave in the direction of crop engagement D1.

Retaining member 50 includes a split ring portion 50-1 to facilitate reception onto bat tube 42. Retaining member 50 includes an anti-rotation protrusion 50-2 that extends into the void of the split ring portion 50-1 for engagement with a corresponding hole (not shown) in bat tube 42. A fastener 52, such as a bolt, is received through a hole 50-3 formed in split ring portion 50-1 and is threaded into a threaded hole 50-4.

Plate member 48 is connected to elongate member 46, with distal end 46-2 of elongate member 46 extending beyond plate member 48. In one embodiment, the distance that elongate member 46 extends beyond plate member 48 is in a range of 10 to 14 inches. Plate member 48 has a continuous smooth front surface 48-1 for engaging a crop in the direction of crop engagement D1. The continuous smooth front surface 48-1 covers a portion of elongate member 46 that does not extend beyond plate member 48. Plate member 48 has a back surface 48-2 opposite to front surface 48-1.

Referring to FIG. 4C, a plurality of reinforcement ribs 54 extend outwardly from back surface 48-2. The plurality of reinforcement ribs 54 is arranged such that a first portion 54-1 of the plurality of reinforcement ribs 54 intersects a second portion 54-2 of the plurality of reinforcement ribs 54. In the present embodiment, for example, the plurality of reinforcement ribs 54 is arranged in a rectangular matrix pattern. In the present embodiment, for example, the longitudinal reinforcement ribs 54-2 are in place to maintain stiffness, while the latitudinal reinforcement ribs 54-1 are in place to maintain the structure of plate member 48 while engaging crop. While the exemplary present embodiment shows the plurality of reinforcement ribs 54 arranged in a rectangular matrix pattern, those skilled in the art will recognize that other patterns of intersecting reinforcement ribs may be utilized, if desired.

Plate member 48 has a proximal edge 48-3, a distal edge 48-4, a first end 48-5, and a second end 48-6. Plate member 48 has a height H extending from proximal edge 48-3 to distal edge 48-4 in a direction from proximal end 46-1 of elongate member 46 toward distal end 46-2 of elongate member 46. Referring to FIGS. 4A and 4B, plate member 48 has a radius R located between proximal edge 48-3 and distal edge 48-4 having a curvature that is convex in the direction of crop engagement D1. Plate member 48 has a width W perpendicular to height H that extends from first end 48-5 toward second end 48-6. In the present embodiment, for example, height H may be approximately three inches and width W may be approximately six inches.

An interlock tab 56 is located adjacent first end 48-5. Interlock tab 56 is elongate along height H of plate member 48. Interlock tab 56 begins near distal edge 48-4 of plate member 48, e.g., just prior to radius R, and interlock tab 56 terminates prior to proximal edge 48-3 of plate member 48 to form notches 60-1, 60-2 at the two corners of first end 48-5 of plate member 48.

An interlock channel 58 is located adjacent second end 48-6. Interlock channel 58 is elongate along height H of plate member 48, with interlock channel beginning near distal edge 48-4 of plate member 48 and interlock channel 58 terminating prior to proximal edge 48-3 of plate member 48.

Referring also to FIG. 3, for adjacent pairs of reel fingers (e.g., reel fingers 44-1, 44-2) of the plurality of reel fingers 44, the interlock tab 56 of the first reel finger 44-1 of an adjacent pair of reel fingers 44-1, 44-2 is engaged with the interlock channel 58 of the second reel finger 44-2 of the adjacent pair of reel fingers 44-1, 44-2. More particularly, in the direction of crop engagement D1, interlock tab 56 of the first reel finger 44-1 engages with the interlock channel 58 of the second reel finger 44-2 to form a shingle joint (i.e., a lap joint), such that the adjacent pair of reel fingers 44-1, 44-2 function as a continuous unit, and with respective continuous smooth front surfaces 48-1 of the adjacent pair of reel fingers 44-1, 44-2 joining in unison to form a substantially continuous smooth elongate bat 62.

The flat, smooth, geometry of the bat 62 tends to engage crop smoothly, with much less opportunity for crop to become lodged in the reel fingers and wrap around the reel as with prior reel fingers. Also, in embodiments wherein elongate member 46 extends beyond plate member 48 a distance in a range of 10 to 14 inches, this length tends to keep down crop from catching on the bats of reel 38 as the bats are moved up and out of crop material.

Having described the preferred embodiment, it will become apparent that various modifications can be made without departing from the scope of the invention as defined in the accompanying claims.

The invention claimed is:

1. A reel finger for use on a harvesting header for an agricultural machine, comprising:
    an elongate member having a proximal end and a distal end, said elongate member having a retaining member located at said proximal end; and
    a plate member connected to said elongate member with said distal end of said elongate member extending beyond said plate member, said plate member having a continuous smooth front surface for engaging a crop in a direction of crop engagement that covers a portion of said elongate member not extending beyond said plate member, said plate member having a back surface opposite to said front surface having a plurality of reinforcement ribs extending outwardly from said back surface.

2. The reel finger of claim 1, wherein said plurality of reinforcement ribs are arranged such that a first portion of said plurality of reinforcement ribs intersect a second portion of said plurality of reinforcement ribs.

3. The reel finger of claim 1, wherein said plate member has a proximal edge, a distal edge, a first end and a second end, said plate member having a height extending from said proximal edge to said distal edge in a direction from said proximal end of said elongate member toward said distal end of said elongate member, and having a width perpendicular to said height said width extending from said first end toward said second end, and further comprising:
    an interlock tab located adjacent said first end; and
    an interlock channel located adjacent said second end.

4. The reel finger of claim 3, wherein said interlock channel is elongate along said height of said plate member, said interlock channel beginning near said distal edge of said plate member and said interlock channel terminating prior to said proximal edge of said plate member.

5. The reel finger of claim 3, wherein said interlock tab is elongate along said height of said plate member, said interlock tab beginning near said distal edge of said plate member and said interlock tab terminating prior to said proximal edge of said plate member to form a notch in a corner of said plate member.

6. The reel finger of claim 1, wherein:
    said elongate member has a curvature that is concave in said direction of crop engagement; and
    said plate member has a proximal edge, a radius and a distal edge, and has a height extending from said proximal edge through said radius to said distal edge in a direction from said proximal end of said elongate member toward said distal end of said elongate member, said radius of said plate member having a curvature that is convex in said direction of crop engagement.

7. The reel finger of claim 1, wherein said reel finger is formed as a unitary single-piece item.

8. A reel finger for use on a harvesting header for an agricultural machine, comprising:
    an elongate member having a proximal end and a distal end, said elongate member having a retaining member located at said proximal end; and
    a plate member connected to said elongate member with said distal end of said elongate member extending beyond said plate member, said plate member having a front surface for engaging a crop in a direction of crop engagement, said plate member having a back surface opposite to said front surface, said plate member having a proximal edge, a distal edge, a first end and a second end, said plate member having a height that extends from said proximal edge to said distal edge in a direction from said proximal end of said elongate member toward said distal end of said elongate member and having a width perpendicular to said height said width extending from said first end toward said second end, said plate member having an interlock tab located adjacent said first end and an interlock channel located adjacent said second end to form a substantially uninterrupted smooth surface between adjacent reel fingers.

9. The reel finger of claim 8, wherein said interlock channel is elongate along said height of said plate member, said interlock channel beginning near said distal edge of said plate member and said interlock channel terminating prior to said proximal edge of said plate member.

10. The reel finger of claim 8, wherein said interlock tab is elongate along said height of said plate member, said interlock tab beginning near said distal edge of said plate member and said interlock tab terminating prior to said proximal edge of said plate member to form a notch in a corner of said plate member.

11. The reel finger of claim 8, wherein:
    said elongate member has a curvature that is concave in said direction of crop engagement; and
    said plate member having a radius located between said proximal edge and said distal edge, said radius having a curvature that is convex in said direction of crop engagement.

12. The reel finger of claim 8, wherein said reel finger is formed as a unitary single-piece item.

13. An agricultural harvester, comprising:
    a power source;
    a feeder housing drivably coupled to said power source; and
    a harvesting header attached to said feeder housing, said harvesting header including a platform, a cutter bar assembly and a reel assembly, said cutter bar assembly and said reel assembly being coupled to said platform, said reel assembly comprising:
        a reel having a plurality of bat tubes spaced around a periphery of said reel, the plurality of bat tubes having a length that extends in a direction of a width of said reel; and
        a respective plurality of reel fingers mounted to each bat tube of said plurality of bat tubes, wherein each reel finger of said plurality of reel fingers includes:

an elongate member having a proximal end and a distal end; and a plate member connected to said elongate member with said distal end of said elongate member extending beyond said plate member, said plate member having a continuous smooth front surface for engaging a crop in a direction of crop engagement that covers a portion of said elongate member not extending beyond said plate member, said plate member having a back surface opposite to said front surface including a plurality of reinforcement ribs extending outwardly from said back surface.

14. The agricultural harvester of claim 13, wherein said plurality of reinforcement ribs are arranged such that a first portion of said plurality of reinforcement ribs intersect a second portion of said plurality of reinforcement ribs.

15. The reel finger of claim 13, wherein:

said elongate member has a curvature that is concave in said direction of crop engagement; and said plate member has a proximal edge, a radius and a distal edge, and has a height extending from said proximal edge through said radius to said distal edge in a direction from said proximal end of said elongate member toward said distal end of said elongate member, said radius having a curvature that is convex in said direction of crop engagement.

16. The agricultural harvester of claim 13, wherein each reel finger of said plurality of reel fingers is formed as a unitary single-piece item.

17. An agricultural harvester, comprising:

a power source;

a feeder housing drivably coupled to said power source; and a harvesting header attached to said feeder housing, said harvesting header including a platform, a cutter bar assembly and a reel assembly, said cutter bar assembly and said reel assembly being coupled to said platform, said reel assembly comprising:

a reel having a plurality of bat tubes spaced around a periphery of said reel, the plurality of bat tubes having a length that extends in a direction of a width of said reel; and a respective plurality of reel fingers mounted to each bat tube of said plurality of bat tubes, wherein each reel finger of said plurality of reel fingers includes:

an elongate member having a proximal end and a distal end; and a plate member connected to said elongate member with said distal end of said elongate member extending beyond said plate member, said plate member having a front surface for engaging a crop in a direction of crop engagement, said plate member having a back surface opposite to said front surface, said plate member having a proximal edge, a distal edge, a first end and a second end, said plate member having a height that extends from said proximal edge to said distal edge in a direction from said proximal end of said elongate member toward said distal end of said elongate member and having a width perpendicular to said height, said width extending from said first end toward said second end, said plate member having an interlock tab located adjacent said first end and an interlock channel located adjacent said second end to form a substantially uninterrupted smooth surface between adjacent reel fingers, wherein for an adjacent pair of reel fingers of said plurality of reel fingers, said interlock tab of a first reel finger of said adjacent pair of reel fingers is engaged with said interlock channel of a second reel finger of said adjacent pair of reel fingers.

18. The agricultural harvester of claim 17, wherein in said crop engagement direction said interlock tab of said first reel finger engages with said interlock channel of the second reel finger to form a shingle joint, such that said adjacent pair of reel fingers function as a continuous unit joining in unison to form a substantially continuous smooth elongate bat surface.

19. The agricultural harvester of claim 17, wherein said interlock channel is elongate along said height of said plate member, said interlock channel beginning near said distal edge of said plate member and said interlock channel terminating prior to said proximal edge of said plate member.

20. The agricultural harvester of claim 17, wherein said interlock tab is elongate along said height of said plate member, said interlock tab beginning near said distal edge of said plate member and said interlock tab terminating prior to said proximal edge of said plate member to form a notch in a corner of said plate member.

21. The agricultural harvester of claim 17, wherein:

said elongate member has a curvature that is concave in said direction of crop engagement; and said plate member has a radius located between said proximal edge and said distal edge, said radius having a curvature that is convex in said direction of crop engagement.

22. The agricultural harvester of claim 17, wherein said reel finger is formed as a unitary single-piece item.

* * * * *